INVENTOR.
S. A. Wilson

2,943,124

HYDROCARBON HYDRATE SEPARATION PROCESS AND SEPARATION UNIT THEREFOR

Samuel A. Wilson, Minden, La., assignor to National Tank Company, Tulsa, Okla., a corporation of Nevada Filed Feb. 25, 1957, Ser. No. 642,159

4 Claims. (Cl. 260—676)

This invention relates to an improvement in dehydrating natural gas streams and more particularly, but not by way of limitation, to a cold separation unit wherein the liquid bath for melting of hydrates is eliminated.

Presently available natural gas stream dehydrating systems such as disclosed in United States Letters Patent No. 2,528,028 issued to A. F. Barry on October 31, 1950, usually employ a hot liquid bath for melting the hydrates present in the gas stream. The present invention contemplates a novel cold separation unit wherein the hydrates of the gas stream are melted by a direct contact with a hot coil. There is no liquid bath provided in the separation unit. Under actual test conditions it has been found that the recovery of condensate in the novel unit is approximately five percent greater than the recovery in the conventional hot liquid bath type of separator. Furthermore, the hot coil type of separation unit provides approximately a ten degree decrease in water dew point over that of the conventional type of separator under substantially identical working conditions. Thus, the unit of the invention will operate efficiently at a lower inlet temperature since the hydrates are brought into direct contact with a hot coil, thereby providing a better heat transfer rate. In addition, a substantially smaller pressure drop is required to provide dehydrated gas in accordance with pipe line specifications.

It is, therefore, an important object of this invention to provide a cold separation unit for the dehydration of a natural gas stream wherein the hydrates of the gas stream are melted by direct contact with a hot coil, thereby eliminating the necessity of providing a hot liquid bath in the unit.

It is another object of this invention to provide a novel cold separation unit for the dehydration of a natural gas stream which provides for a greater condensate recovery with a substantially reduced water dew point of the gas stream.

Still another object of this invention is to provide a novel cold separation unit for the dehydration of a natural gas stream which may be efficiently operated at substantially lower inlet pressures due to the direct transfer of heat from a hot coil to the hydrates present in the gas stream.

It is still a further object of this invention to provide a cold separation unit for the dehydration of a natural gas stream which is simple and efficient in operation and durable and economical in construction.

Other objects and advantages of the invention will be evident from the following detailed description, read in conjunction with the accompanying drawings, which illustrate my invention.

Figure 1:
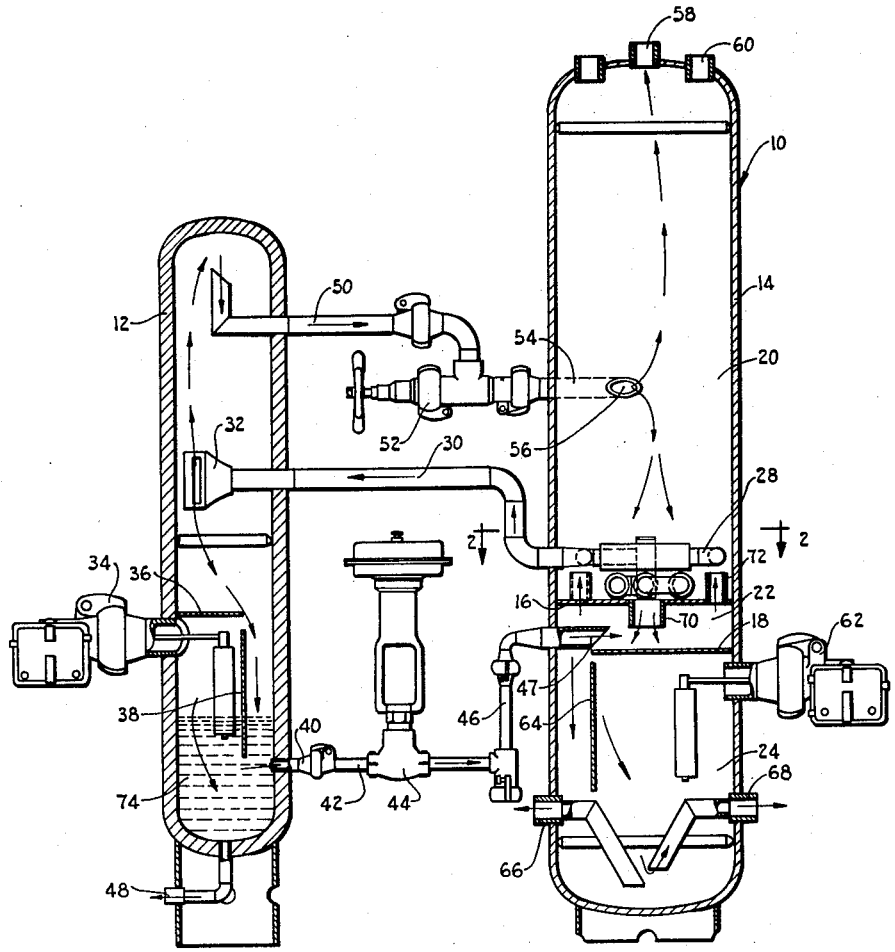
Figure 1 is a vertical sectional view of a cold separation unit embodying the present invention.

Referring to the drawings in detail, reference character 10 refers generally to a cold separation unit comprising a first stage tank 12 and a second stage vessel 14. The vessels 12 and 14 are preferably of substantially cylindrical configuration and are disposed in an upright vertical position. The vessel 14 is provided with an upper baffle member 16 disposed in the lower portion thereof and a lower baffle member 18 spaced slightly therebelow. The baffle member 16 provides an upper chamber 20 within the tank 14. The baffle member 18 forms a chamber 22 which is in communication with a lower chamber 24 for a purpose as will be hereinafter set forth.

Figure 2:
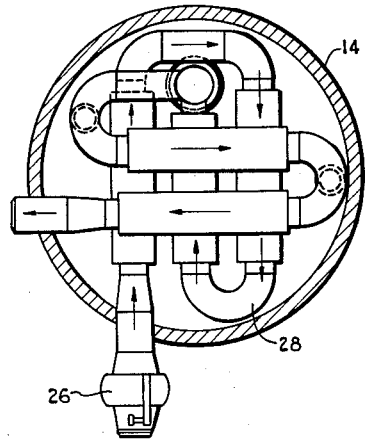
Figure 2 is a section view taken on line 2—2 of Fig. 1.

The tank 14 is provided with an inlet connection 26 (Fig. 2) which is in connection with a coil member 28. The coil member 28 is suitably disposed within the upper chamber 20, and is in communication with a pipe 30 which extends from the tank 14 into the tank 12. A suitable outlet member 32 is provided on the pipe 30 for discharging fluid into the tank 12. A suitable liquid level control apparatus 34 is provided for the tank 12 for controlling the liquid height within the tank 12 as will be hereinafter set forth. It is preferable to provide suitable baffle members 36 and 38 to protect the control apparatus 34 from damage due to the force of the fluid entering the tank 12. An outlet connection 40 is provided in the lower portion of the tank 12 for directing fluid from the tank 12 through the line 42. A suitable valve 44 is preferably provided in the flow line 42 for co-action with the level control member 34 to provide communication between the outlet line 42 and a conduit 46 which conducts fluid through an outlet port 47 and into the chamber 22. A suitable drain member 48 is preferably provided in the lowermost portion of the tank 12 for the draining of residue and the like therefrom.

A conduit 50 is provided in the upper portion of the tank 12, and extends outwardly therefrom into communication with a suitable choke member 52. The choke 52 is connected to a conduit 54 having an outlet port 56 disposed within the upper chamber 20 of the tank 12. An outlet port 58 is provided at the uppermost portion of the tank 12, and is preferably in communication with a conduit (not shown) for delivering dehydrated gas from the tank 14 to a transmission line or the like (not shown). A plurality of relief or safety vents may also be provided at the top of the tank 14 for relief of any excessive pressure therein. A liquid level control apparatus 62 is preferably provided in the lower chamber 24 of the tank 14 for controlling the liquid height therein. The baffle 18 and a complementary baffle member 64 protect the control member 62 from damage due to the force on the fluid discharging into the chamber 22. A suitable outlet member 66 is provided adjacent the bottom of the tank 14 for draining residue, and the like, therefrom. An outlet connection member 68 is provided in the chamber 24 for withdrawal of distillate therefrom, as will be hereinafter set forth.

A centrally disposed tube member 70 is provided on the baffle member 16, and extends downwardly therethrough to provide communication between the chambers 20 and 22. A plurality of similar circumferentially spaced tube members 72 are provided on the baffle member 16, and extend upwardly therethrough to provide further communication between the chambers 20 and 22 as will be hereinafter set forth in detail.

Operation

A natural gas stream containing a mixture of hydrocarbons and water components in both the vapor and liquid phases initially enters the inlet 26 in the second stage tank 14 from a high pressure distillate oil well (not shown). The gas is usually at a high temperature and pressure as it enters the tank 14 and flows through the coil 28. The heat of the gas stream passing through the coil 28 maintains the coil at a high temperature at all times. The temperature of the gas stream will be slightly reduced as it passes through the coil 28 and pipe 30 for discharge through the outlet 32 into the first stage tank 12. Paraffin and mud particles present in the gas stream will not precipitate from the influent gas at high temperatures. Thus, the hot gas stream passing through the coil 28 will not permit any accumulation of paraffin or mud therein. As the gas is cooled, however, and enters the tank 12, mud and paraffin will be precipitated in liquid form with the water and heavy hydrocarbon components of the gas stream. The liquid or distillate will fall by gravity and accumulate in the bottom of the tank 12 as shown at 74 while the gaseous components of the gas stream will rise within the vessel 12. Thus, the liquid and gas components of the gas stream are separated at the well head pressure.

The gaseous components at well head pressure, which is usually approximately two thousand to four thousand pounds per square inch, will leave the vessel 12 through the conduit 50 and pass through the choke member 52. The pressure of the gas is preferably reduced at the choke to a transmission line pressure, which is usually approximately five hundred to one thousand two hundred pounds per square inch. The reduction in pressure of the gaseous components causes a simultaneous reduction of the temperature. The reduced and cooled fluid is then directed through the conduit 54 for discharge through the outlet port 56 into the chamber 20 of the second stage vessel 14. The temperature of the fluid has been reduced to the hydrate formation stage at the outlet port 56. The hydrates and condensed hydrocarbons fall downwardly by gravity in the vessel 14 and accumulate on the baffle 16 and around the coil 28. The hydrates are melted upon the contact with the hot coil 28, thereby forming gas and water. The condensed hydrocarbons, however, are not heated to the same degree as in units employing a liquid bath. The combined hydrocarbons and water drain through the tube member 70 and fall into the chamber 22 where they are directed downwardly into the chamber 24. The gas remaining in the upper portion of the chamber 20 of the vessel 14 is dehydrated, and flows out of the vessel through the opening 58 for delivery through a transmission line (not shown) to a storage tank, or the like (not shown).

The quantity of the heavy hydrocarbon components and water, or the distillate 74 accumulated in the lower portion of the first stage vessel is controlled in any well known manner by the liquid level control device 34. The valve 44 co-acts with the level control device 34 to permit the flow of the distillate through the lines 42 and 46 into the chamber 22 of the vessel 14. The distillate is directed into the lower chamber 24 and accumulates therein (not shown). A certain degree of stabilization is provided in this chamber as the condensed hydrocarbons from the upper chamber 20 are precipitated into the distillate. The heavy hydrocarbons components of the distillate will absorb the lighter ends of the condensed hydrocarbons whereby gas vapors will be released. These released gas vapors are directed into the upper chamber 20 through the tube member 72. The vapors released from the hydrocarbons are warmer than the dehydrated gas present in the upper chamber 20, and are therefore partially stabilized and condensed by contact with the cold gas in the chamber 20. The accumulated hydrocarbons and water will settle to the bottom of the chamber 24 and may be removed through the outlet connection member 68. It will be apparent that the level of the hydrocarbon accumulation within the chamber 24 may be controlled in any well known manner by the control member 62 and a cooperating motor valve (not shown) which controls the flow of fluid through the outlet port 68.

As hereinbefore set forth, the coil member 28 is maintained at a relatively high temperature by the hot gas stream passing therethrough. Thus, the hydrates precipitating downwardly within the upper chamber 20 of the vessel 14 will be readily melted upon contact with the coil 28. The heat transfer rate will be very high because of the direct contact of the coil 28 with the hydrates. Thus, the hydrates are more efficiently melted, and the recovery is considerably greater than in conventional separators utilizing a liquid bath for the melting of hydrates. Although the unit shown herein does not utilize a heat exchanger, however, such a device is fundamental and basic, and may be provided with the unit when well head conditions require the utilization thereof.

From the foregoing, it will be apparent that the present invention provides a novel cold separation unit for the dehydrating of a natural gas stream. The gas stream containing hydrocarbons and water components in the vapor and liquid phases at high pressure and temperature is passed through a coil disposed within a second stage vessel for maintaining the coil at a relatively high temperature. The gas stream enters the first stage vessel substantially at the well head pressure and at a slightly reduced temperature whereby the water components and heavy hydrocarbons will precipitate from the gaseous components. The liquid components and heavy hydrocarbons, or distillate, will then flow from the first stage vessel into the lower portion of the second stage vessel. The gaseous components will pass from the first stage vessel into the upper portion of the second stage vessel. The gaseous components are directed through a choke member wherein the pressure and temperature of the gas is reduced to the hydrate formation stage. The hydrates will condense and fall downwardly in the second stage vessel wherein they will be brought into direct contact with the hot coil. The heat transfer rate is very high, and the hydrates are melted in such an efficient manner that gas and water components are formed. The gas components, of course, rise within the second stage vessel for discharge therefrom with the dehydrated gas stream. The water components and condensed hydrocarbons, however, are directed into the distillate accumulated in the lower portion of the second stage vessel. The heavy hydrocarbons within the distillate tend to absorb the lighter hydrocarbons precipitating into the distillate, and provide for a degree of stabilization in the vessel. The dehydrated gas is withdrawn from the upper portion of the second stage vessel for delivery to storage, or the like, and the condensed hydrocarbons may be removed from the lower portion thereof.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a cold separation unit for dehydrating a natural gas stream, comprising a first stage vessel and a second stage vessel, an inlet connection member provided in the second stage vessel for receiving the gas stream, a coil member disposed within the second stage vessel and in communication with the inlet member, means providing communication between the coil member and the first stage vessel for directing the gas stream into the first stage vessel, means for transferring precipitates from the gas stream from the first stage vessel to the second stage vessel, means to direct gas from the first stage vessel into the second stage vessel, means for reducing the pressure and temperature of the gas stream to the hydrate forming stage at the entry point of the gas stream into the second stage vessel, baffle structure below the entry point of the gas stream into the second stage vessel to receive thereon substantially all hydrates formed and hold these hydrates in direct heat exchange with the coil member to melt the hydrates, means for collecting the liquid of the melted hydrates at a point below the baffle structure and coil member, control means to remove liquid from the collection from the second stage vessel and to maintain the level of collected liquid below the baffle and coil, and means for withdrawal of the dehydrated gas from the second stage vessel.

2. A cold separation unit for dehydrating a natural gas stream normally containing water, mud and paraffin, and comprising a first stage vessel and a second stage vessel, a transverse baffle member provided in the second stage vessel to provide an upper chamber and a lower chamber, an inlet port provided in the second stage vessel for receiving the gas stream, a coil member disposed within the upper chamber and above the baffle member and in communication with the inlet port for directing the gas stream through the second stage vessel, conduit means for conducting the gas stream from the coil member into the first stage vessel, means for discharging the gas stream into the first stage vessel wherein the water, mud and paraffin distillate components are precipitated from the gaseous components, means for directing the distillate from the first stage vessel into the lower chamber of the second stage vessel, conduit means for directing the gaseous components from the first stage vessel into the second stage vessel above the coil member and baffle member, a choke member interposed in the second mentioned conduit means for reducing the temperature and pressure of the gas, means for discharging the cooled and reduced gas into the second stage vessel wherein hydrates are condensed from the gas stream, said hydrates precipitate downwardly within the second stage vessel onto the baffle and into direct contact with the coil member for melting of the hydrates, passageway means for directing the condensed hydrates into the lower chamber for mixing with the distillate, means for withdrawing the distillate and maintaining its level below the baffle and coil, and means for withdrawing the dehydrated gas.

3. A cold separation unit for dehydrating natural gas, including, a vessel adapted to operate at normal transmission pressure for natural gas, a conduit opening into the vessel to bring natural gas from a well at a pressure substantially greater than the normal transmission pressure, a choke in the conduit from the well to reduce the pressure of the well stream to the normal transmission pressure at the conduit opening into the vessel, baffle structure in the vessel positioned below the choked conduit opening into the vessel to receive substantially all hydrates from the conduit, a heated coil structure in the vessel and above the baffle structure and below the choked inlet so as to contact the hydrates collected on the baffle structure with the bare external surface of the coil and thereby melt the hydrates, means for collecting the liquid of the melted hydrates at a point below the baffle structure and coil structure, control means to remove collected liquid from the vessel and maintain the level of collected liquid below the coil structure, and a connection for withdrawing the dehydrated gas from the vessel.

4. The method of dehydrating natural gas which includes, withdrawing the gas from a well at a pressure above normal transmission pressure, reducing the pressure of the gas to form hydrates at normal transmission pressure, forming a collection of the hydrates, directly heat-exchanging substantially all the hydrates with a heat-exchange surface heated by the incoming gas before the pressure of the gas is reduced in order to continuously melt the hydrates, drawing off the liquid resulting from the hydrates being melted by direct heat exchange with the heat-exchange surface heated by the gas from the well into a collection of the liquid free of contact with the heat-exchange surface, continuously withdrawing the gas at the normal transmission pressure, and continuously withdrawing liquid from the collection to maintain the level of the liquid removed a finite distance from the direct heat-exchange between the heat-exchange surface and the hydrates.

References Cited in the file of this patent

UNITED STATES PATENTS

| | | |
|---|---|---|
| 2,375,560 | Hutchinson et al. | May 8, 1945 |
| 2,665,565 | Parks | Jan. 4, 1952 |
| 2,671,322 | Barry | Mar. 9, 1954 |
| 2,738,026 | Glasgow et al. | Mar. 13, 1956 |
| 2,747,002 | Walker et al. | May 22, 1956 |
| 2,758,665 | Francis | Aug. 14, 1956 |